United States Patent
Nash et al.

(10) Patent No.: US 12,310,331 B2
(45) Date of Patent: May 27, 2025

(54) PET MIND TOY

(71) Applicants: Gina Nash, Cherry Hill, NJ (US); Fred Nash, Cherry Hill, NJ (US)

(72) Inventors: Gina Nash, Cherry Hill, NJ (US); Fred Nash, Cherry Hill, NJ (US)

( * ) Notice: Subject to any disclaimer, the term of this patent is extended or adjusted under 35 U.S.C. 154(b) by 49 days.

(21) Appl. No.: 18/067,761

(22) Filed: Dec. 19, 2022

(65) Prior Publication Data
US 2023/0217899 A1    Jul. 13, 2023

Related U.S. Application Data

(63) Continuation-in-part of application No. 17/647,597, filed on Jan. 10, 2022, now abandoned.

(51) Int. Cl.
*A01K 15/02* (2006.01)
*A63F 9/06* (2006.01)

(52) U.S. Cl.
CPC .......... *A01K 15/025* (2013.01); *A63F 9/0601* (2013.01)

(58) Field of Classification Search
CPC .. A01K 15/025; A01K 15/026; A01K 5/0114; A01K 15/02; A01K 15/027; A01K 1/033; A63F 9/0601; A63F 2250/24; A63F 7/042
USPC .............. 119/707, 709, 702, 51.01; D30/160
See application file for complete search history.

(56) References Cited

U.S. PATENT DOCUMENTS

| | | | |
|---|---|---|---|
| 2,729,020 A | * | 1/1956 | Frampton ................ A63F 7/04 273/153 R |
| 5,709,165 A | * | 1/1998 | Nurmikko ............ A01K 15/025 119/51.01 |
| 7,238,026 B2 | | 7/2007 | Moritz |
| 7,320,296 B2 | | 1/2008 | Morrison |
| 7,832,362 B2 | | 11/2010 | DeGhionno |
| 8,225,750 B2 | | 7/2012 | Newman |
| 10,772,298 B1 | | 9/2020 | Mullin |
| 11,013,215 B2 | | 5/2021 | Citak |

(Continued)

FOREIGN PATENT DOCUMENTS

GB     2488379 A    8/2012

OTHER PUBLICATIONS

My Intelligent Pets—Interactive Puzzle Game Toy for Dogs {Pyramid), Amazon Web Site, My Intelligent Pets—Interactive Puzzle Game Toy for Dogs {Pyramid), Amazon Web Site, https://www.amazon.com/My-Intelligent-Dog-Interactive-Pyramid/dp/B071WLR2P6.

*Primary Examiner* — Peter M Poon
*Assistant Examiner* — Jeffrey R Larsen
(74) *Attorney, Agent, or Firm* — Emmett S. Collazo; Jonathan M. Waldman

(57) ABSTRACT

A pet mind toy is disclosed. The pet mind toy comprise a plurality of sides detachably coupled to each other via a plurality of edges. At least four slots carved into the first side. At least two locking doors are configured with locking means. At least one flap door for the least one slot, openable at one or more angles. At least one knob door configured with one or more panels. A second side of the plurality of sides comprise a plurality of levels, a plurality of openings and a flap. A third side having a rod coupled with one or more popsicles. A fourth side of the plurality of sides affixed with a treat retrieval roller toy. A shaft integrated within the fourth side and a roller attached with the shaft. A fifth side of the plurality of sides configured with an opening for storing one or more objects.

20 Claims, 11 Drawing Sheets

(56) References Cited

U.S. PATENT DOCUMENTS

| | | | |
|---|---|---|---|
| 2003/0163936 A1* | 9/2003 | Floss | B42D 5/04 40/107 |
| 2006/0254301 A1* | 11/2006 | Beltezore | A23K 50/40 62/343 |
| 2010/0077961 A1 | 4/2010 | Lipscomb | |
| 2011/0232583 A1 | 9/2011 | Yamin | |
| 2021/0127637 A1 | 5/2021 | Citak | |

* cited by examiner

PET MIND TOY

CROSS REFERENCE TO RELATED APPLICATIONS

This application is a continuation-in-part application which claims the priority benefit of the filing date of U.S. Provisional application Ser. No. 17/647,597, filed Jan. 10, 2022, the entire disclosures of which are incorporated herein by reference.

FIELD OF THE DISCLOSURE

The invention relates to a pet mind and activity stimulation toy. More particularly, the invention relates to a pet mind toy which is a multi-activity cube designed for a pet's play and training that delivers and provides mind stimulation activity for the pet without the need of human involvement.

BACKGROUND OF THE DISCLOSURE

The subject matter discussed in this background section should not be assumed to be prior art merely as a result of its mention herein. Similarly, any problems mentioned in this background section or associated with the subject matter of this background section should not be assumed to have been previously recognized in the prior art. The subject matter as disclosed in this background section merely represents different approaches related to a pet mind toy, wherein such apparatuses themselves may also correspond to implementations of the claimed technology and invention.

Domestic animals, especially pets, rely on their owners as a source of companionship. However, many owners often have busy daily schedules that restrict the amount of time that an owner can commit to entertaining a pet. Owners often rely on pet toys or pet entertainment devices such as balls or string to occupy pets when they are not readily available. These pet toys, and the like, allow the pet, for example, to chase and grab at the toy for entertainment and/or training. To gain the pet's attention, the toys often move either under their own power, or by momentum from the pet owner or pet itself. For example, a feline may bat at a ball and therefore cause the ball to roll away for subsequent chase. The movement of the ball further engages the attention of the feline and causes the feline to continue to chase and bat at the ball. As noted in the prior art, pet toys have been in use for decades. Typically, pet toys, including dog toys, cat toys, and other pets' toys, are comprised of materials such as rubber, plush, TPE (thermoplastic elastomer), and/or the like, or edible materials. Pet toys may be in the form of a synthetic bone, animal (e.g., instinctual prey animal), or the like. Other constructions show that some pet toys may be solid and some may be hollow allowing for various pet play, entertainment, training, or education. While these devices may be suitable for the particular purpose to which they address, they are not suitable or provide functionality as puzzle toys that animals can play with in a way that rewards them while instilling entertainment, stimulation, and/or learning.

Prior art, for various aspects contained there within, relevant to this disclosure includes U.S. Pat. No. 4,572,108A to Daifotes, GB Pat. Publication No. GB220416A to William, KR Pat. Publication No. KR20070009414U to Jung, and KR Pat. Publication No. KR20070009414U to Kim. In each of these prior arts, an animal entertainment device is provided to entertain pets. This is not an ideal solution to the problem of stimulating mind of the pet without complete human intervention.

In particular, reference '108 to Daifotes discloses a compact, animal-operated animal feeder is disclosed in which the feeder housing has a pair of foldable doors mounted over a feed opening and latched in a closed position. The doors can be unlatched by the animal, which carries a latch release device about its neck, and the natural tendency of the animal to push toward the feed will fold the doors laterally to an open position permitting access to food inside the feeder. A magnetic latch release assembly in which a plurality of permanent magnets is arranged in an array to provide a key for release of a latch having correspondingly arranged magnets is also disclosed. A compound door including a magnetically releasable latch assembly is also disclosed. However, unlike the subject matter of the disclosed invention, Daifotes does not discuss or suggest the aspect that a gate with locking means that can be opened or closed by the head of the animal inwardly of the feed housing or enclosure. Further, Daifotes does not disclose the aspect of stimulating pet mind using different puzzle activities, nor does Daifotes disclose or mention variation of door types to stimulate a pet's mind.

Reference '416 to William discloses a dry-feeder for pigs which comprises a hopper c in the outlet d of which a rocking grooved roller h is arranged, the roller being moved through a spring-controlled frame m to deliver the food to troughs n. In one form, the frame m has longitudinal bars k with which the animals come into contact. Alternatively, rollers or wheels x may be fitted on the frame to contact with hanging doors v that are moved by the animals. Springs o or y control the movement of the frame, and the food supply is varied by raising or lowering the roller h by means of rods r and nuts t, this adjustment brings the frame nearer to or farther from the stops that limit its movement. A vane n may be provided on the drum h to agitate the food. However, unlike the subject matter of the disclosed invention, William does not discuss or suggest the aspect that a providing treat(s) to the pet through same means as presented in present invention.

Reference to '094 to Jung discloses a multi-story doghouse with stairs and climbing boards installed indoors and outdoors. It is a multi-story doghouse that can breed multiple dogs at once by utilizing the spacious indoor space of the multi-story doghouse even in a narrow house or garden. According to the present invention, it is possible to efficiently utilize and manage space, especially when it is necessary to raise several dogs (for example, in veterinary hospitals, dog sales shops, dog hotels, dog kindergartens, training centers, etc.). In addition, since dogs have fun going up and down in the kennel, it is possible to induce more activities of the dogs to increase the amount of exercise, and it is possible to significantly reduce the stress of the dogs in the narrow space of the existing kennel with a single-story structure. However, unlike the subject matter of the disclosed invention, Jung does not disclose or suggest the aspect of cube shaped box that allows different activity to the pets at the same time. In addition, Jung discloses an apparatus meant for dogs to enter into, whereas the subject matter of the present disclosure describes an apparatus whereby the pet generally engages with it standing externally to the apparatus.

Reference '059 to Kim discloses a cat table in which a maze for cats is formed, and an empty housing having an open upper part and a maze formed therein using a plurality of diaphragms, and one side formed in the lower part of the housing for holding various objects, a storage box with one side open for storage, a moving space formed on the other side of the lower side of the housing and having an access hole so that a cat can move into the housing, and a moving space formed on the front of the housing to hold various objects. The table is characterized in that it includes a desk that is formed to be able to perform work. However, unlike the subject matter of the disclosed invention, Kim does not discuss or suggest the aspect of providing flaps to the housing. Further, Kim does not disclose the aspect of stimulating the pet's mind using different puzzle activities configured in/on the housing construction.

Given the deficiencies of the prior art, the need remains for an effective and entertaining mind stimulating apparatus for a pet which does not require human intervention while also providing treats from the same apparatus when the pet solves a puzzle.

SUMMARY OF THE DISCLOSURE

According to embodiments illustrated herein, a novel, simple and inexpensive pet mind toy is disclosed. The pet mind toy comprises a plurality of sides detachably coupled to each other via a plurality of edges. Further, the plurality of sides of the pet mind toy are interchangeable and replaceable with different sides. Furthermore, at least four slots are carved/configured into/onto the first side for holding treats for a pet. Further, at least two locking doors for the least two slots, wherein the at least two locking doors are configured with locking means. Further, at least one flap door for the at least one slot, wherein the at least one flap door is openable at one or more angles, and at least one knob door for the at least one slot, wherein the at least one knob door is configured with one or more panels. Further, a second side of the plurality of sides is comprised of a plurality of levels wherein each level has a slide parallel to the levels, wherein the slide includes a first end and a second end. Further, a plurality of openings integrated at the second end of each slide is configured to connect the plurality of levels. Even further, an opening integrated over the second side is fashioned to receive a ball into the plurality of levels, wherein the ball moves between the plurality of levels through the plurality of openings. Furthermore, a third side of the plurality of sides includes a rod coupled with at least one popsicle configured to be placed over a tray positioned to capture drip from the popsicle. Even further, a fourth side of the plurality of sides is affixed with a treat retrieval roller toy element for the pet to find and retrieve treats. The treat retrieval roller comprises a shaft integrated within the fourth side. Further, a roller attached with the shaft, is configured to be rotatable in a clockwise and anticlockwise direction. Even further, a fifth side of the plurality of sides is configured with an opening for storing one or more objects.

According to embodiments illustrated herein, a novel, simple and inexpensive pet mind toy is disclosed. The pet mind toy comprises a plurality of sides detachably coupled to each other via a plurality of edges. The plurality of sides is detachably coupled to each other via a plurality of edges. Further, a first side of the plurality of sides comprises at least four slots carved into the first side for holding treats for a pet. Furthermore, at least two locking doors for the at least two slots, wherein the at least two locking doors, are configured with locking means. Even further, at least one flap door is configured onto the at least one slot. Furthermore, at least one knob door for the at least one slot, is configured with one or more panels. Further, a second side of the plurality of sides comprises a plurality of levels wherein each level has a slide parallel to the levels, wherein the slide has a first end and a second end. Furthermore, a plurality of openings integrated at the second end of each slide is configured to connect the plurality of levels. In one exemplary embodiment, an opening includes flap integrated on the second side to receive a ball into the plurality of levels, wherein the ball moves between the plurality of levels through the plurality of openings. In another exemplary embodiment, a third side of the plurality of sides includes a rod coupled with the at least one popsicle placed over a tray, wherein the one or more popsicles trains the pet to determine the rate of consumption of the at least one popsicle by the pet. Furthermore, a fourth side of the plurality of sides is affixed with a treat retrieval roller toy, wherein the treat retrieval roller, in an aspect of the pet mind toy, provides a means and/or otherwise encourages the pet to find and retrieve treats. In a further embodiment, the treat retrieval roller toy comprises a shaft integrated with/within the fourth side. In yet an even further embodiment, a roller, including a shaft attached thereto, is rotatable in a clockwise and an anticlockwise direction, and is configured with one or more recesses for holding treats to be retrieved by the pet. Further, a fifth side of the plurality of sides is configured with an opening for storing one or more objects.

BRIEF DESCRIPTION OF THE DRAWINGS

While the specification concludes with claims particularly pointing out and distinctly claiming particular embodiments of the present disclosure, various embodiments of the present disclosure can be more readily understood and appreciated from the following descriptions of various embodiments of the present disclosure when read in conjunction with the accompanying drawings, in which:

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Some embodiments of this disclosure, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems, and methods are now described.

Embodiments of the present disclosure will be described more fully hereinafter with reference to the accompanying drawings in which like numerals represent like elements throughout the several figures, and in which example embodiments are shown. Embodiments of the present disclosure may, however, be embodied in alternative forms and should not be construed as being limited to the embodiments set forth herein. The examples set forth herein are non-limiting examples and are merely examples among other possible examples.

Figure 1A:
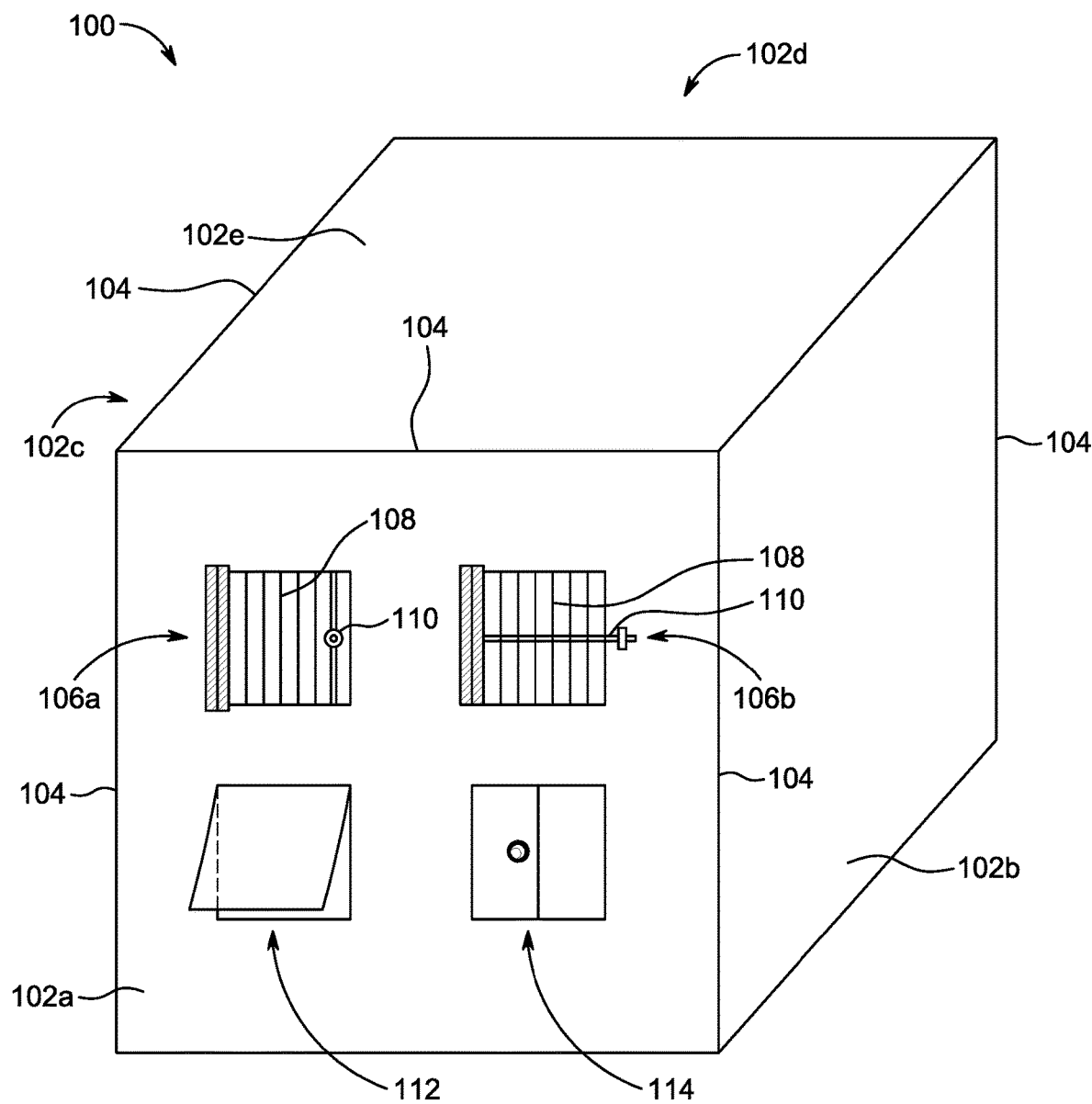
FIG. 1A illustrates an isometric view of a pet mind toy, according to an embodiment of the present disclosure.

FIG. 1A illustrates an isometric view of a pet mind toy 100, according to an embodiment of the present disclosure. FIG. 1A is described in conjunction with FIGS. 1B-1I, FIGS. 2A-2B, FIG. 3, FIGS. 4A-4B, and FIG. 5.

The pet mind toy 100 may also be referred to as a multi-activity apparatus or a mind stimulating apparatus for pets. The pet mind toy 100 may be employed for a purpose of engaging a pet for extended period of time in an activity or puzzle without human intervention. The pet mind toy 100 may also provide a plurality of activities or puzzles for the pet to perform and to earn a reward or treat after completion of the performed activity or puzzle. In this manner the pet such as a dog or cat may be engaged for the extended period of time with the pet mind toy 100. It can be noted that the pet may be rewarded at least with a treat after completion of each activity or puzzles of the pet mind toy 100. It may also be noted that each activity or puzzle is designed for pets to enjoy the activities or puzzles while achieving a goal set in each activity. Furthermore, the one or more pets may be engaged to perform an activity or solve a puzzle with the single pet mind toy 100. In one embodiment, the pet mind toy 100 may be constructed from materials such as plastic, metal, moldable plastic etc.

The pet mind toy 100 may comprise a plurality of sides 102 connected together via a plurality of edges 104. The plurality of sides 102 may have any suitable shape to improve engagement of pets. The plurality of sides 102 may be connected via a locking means (not shown in FIGS. 1A-1B) that may be used to engage or disengage the plurality of sides 102. Furthermore, the locking means may comprise a magnetic attachment, a screw mechanism or plurality of latches to hold at least two sides of the plurality of sides in position. It may be noted that the locking means is configured on the perimeter of the plurality of sides 102. Furthermore, the locking means of the plurality of sides 102 may be supported by an internal frame structure.

Further, the plurality of sides 102 may comprise a first side 102a, a second side 102b, a third side 102c, a fourth side 102d, and a fifth side 102e. It should be noted that the sides 102a-102e may be interchangeable with different sides that may be configured with different mind stimulating activities or puzzles for the pets. The pet mind toy 100 may be a cubical box with each side provided for performing different activities for the pet. Furthermore, the first side 102a of the plurality of sides 102 may comprise at least four slots that are carved/configured into/onto the first side 102a of the pet mind toy 100. Further, each of the slots may be configured with space to place or hold a reward or treat for the pet after competition of each activity.

Figure 1B:
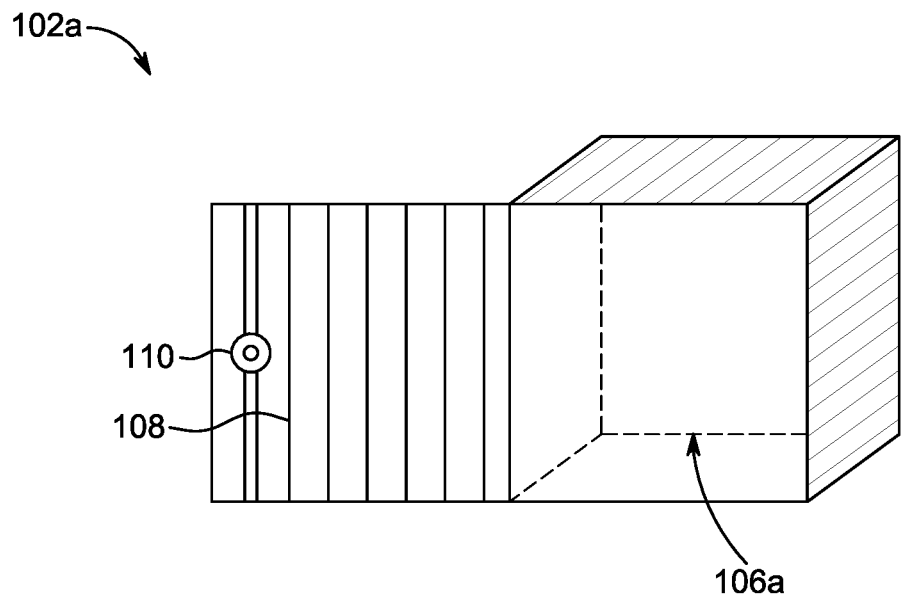
FIG. 1B illustrates a front view of a first slot carved on a first side of the pet mind toy, according to an embodiment of the present disclosure.
Figure 1C:
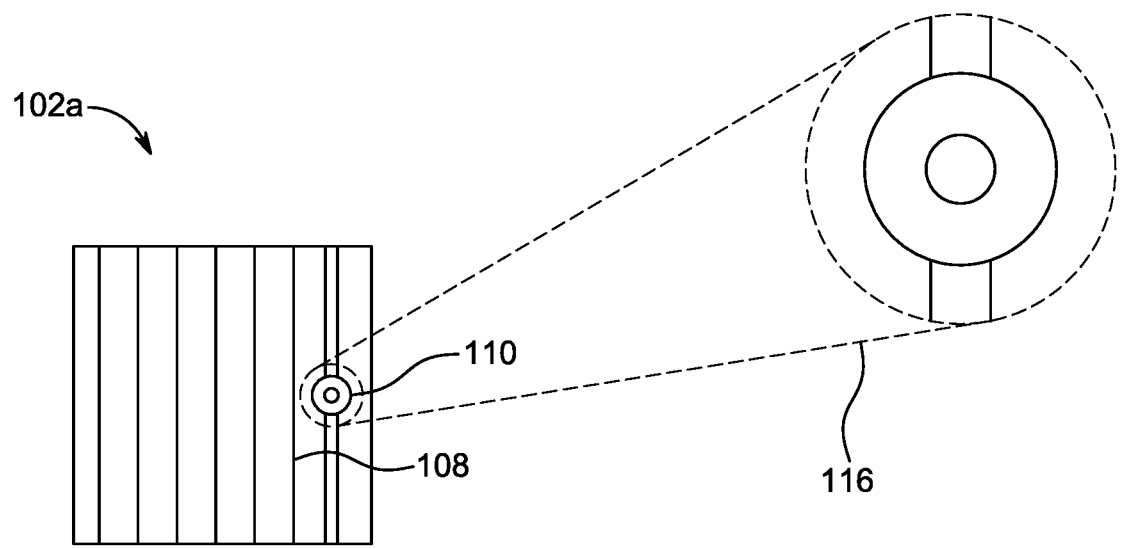
FIG. 1C illustrates a locking door of the first slot, according to an embodiment of the present disclosure.

The first side 102a may comprise a first slot 106a as shown in FIG. 1A. Furthermore, the first slot 106a may be a cubical box of pre-defined dimensions that may be configured to hold the treat in place as shown in FIG. 1B. The pre-defined dimensions may range from zero to the perimeter of the first side 102a. Furthermore, the first slot 106a may comprise a locking door 108 coupled to at least one end of the first slot 106a, and configured to open and close the locking door 108 using a locking means 110, as shown in FIG. 1A, FIG. 1B, and FIG. 1C. In one embodiment, the locking door 108 may be a knob door. Furthermore, the locking door 108 may be a mesh of metallic rods welded together, a plastic rod, or any other construction and material. Even further, the mesh of the locking door 108 may be configured to prevent access to rewards present inside the first slot 106a for the pets, when in a locked state. In one exemplary embodiment, the first slot 106a may be 3.5 inches wide, 3.5 inches in height and 1-inch-deep within the first side 102a of the pet mind toy 100.

Figure 1D:
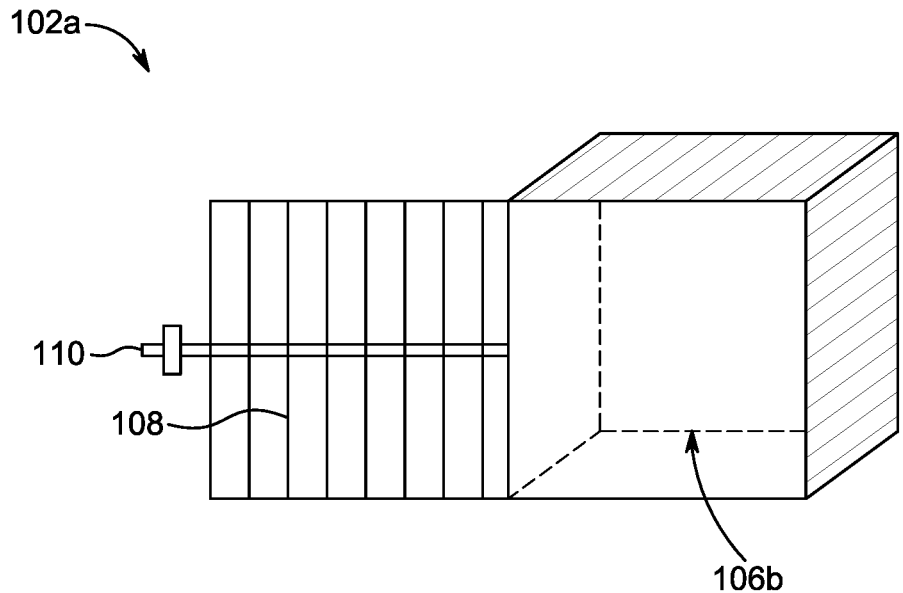
FIG. 1D illustrates a front view of a second slot carved on a first side of the pet mind toy, according to an embodiment of the present disclosure.
Figure 1E:
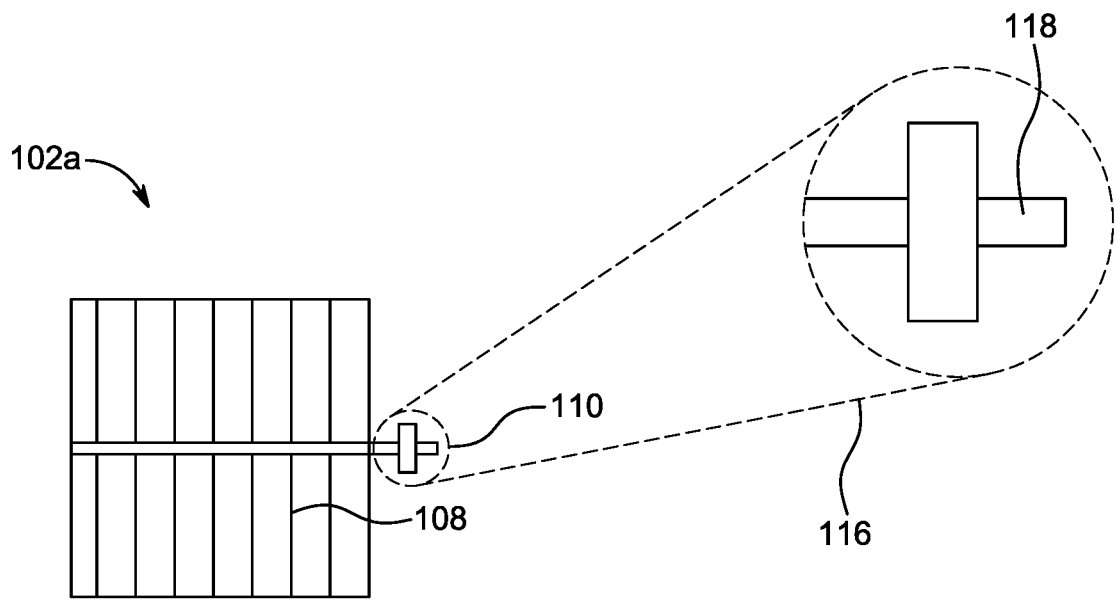
FIG. 1E illustrates a locking door of the second slot, according to an embodiment of the present disclosure

Further, the first side 102a may comprise a second slot 106b as shown in FIG. 1A. The second slot 106b may be a cubical box of pre-defined dimensions that may be configured to hold the treat in place, as shown in FIG. 1D. Furthermore, the second slot 106b may comprise the locking door 108 that is coupled to at least one end of the second slot 106b, and configured to be opened and closed using the locking means 110, as shown in FIG. 1A, FIG. 1D and FIG. 1E. In one embodiment, the locking door 108 may be a latch door. Furthermore, the locking door 108 may be a mesh of metallic rods welded together, a plastic rod(s), or any other construction and material. In one exemplary embodiment, the second slot 106b may be 3.5 inches wide, 3.5 inches in height and 1-inch-deep within the first side 102a of the pet mind toy 100. Furthermore, the locking door 108 may be constructed from a material selected from a group of materials of plastic, metal, wood, etc. In one exemplary embodiment, the locking door 108 is made of metallic rods welded together. Even further, in an exemplary embodiment, the thickness of the locking door 108 is 0.1 inches.

Further, the first side 102a may comprise a third slot 112 and a fourth slot 114 carved into the first side 102a of the pet mind toy 100. The third slot 112 is described in conjunction with FIG. 1F, and the fourth slot 114 is described in conjunction with FIG. 1G.

Further, the locking means 110 may comprise a lock 116, as shown in FIG. 1C and FIG. 1E, fixed to the locking door 108 of the first side 102a of the pet mind toy 100. In one embodiment, the lock 116 may correspond to a lock of a knob door, as shown in FIG. 1C.

In another embodiment, the lock 116 may be configured with a pair of holes for receiving a sliding rod 118, as shown in FIG. 1E. The sliding rod 118 may be configured to slide from left to right into the lock 116, while opening and closing the locking door 108, as shown in FIG. 1E. Further, the lock 116 may be operated via a sliding mechanism to lock the locking door 108.

Further, the locking means 110 may also include a knob 126 or a lever. The knob 126 is fixed to the fourth slot 114 as shown in FIG. 1H. The knob 126 visually provides a different design structure for the pet.

Figure 1F:
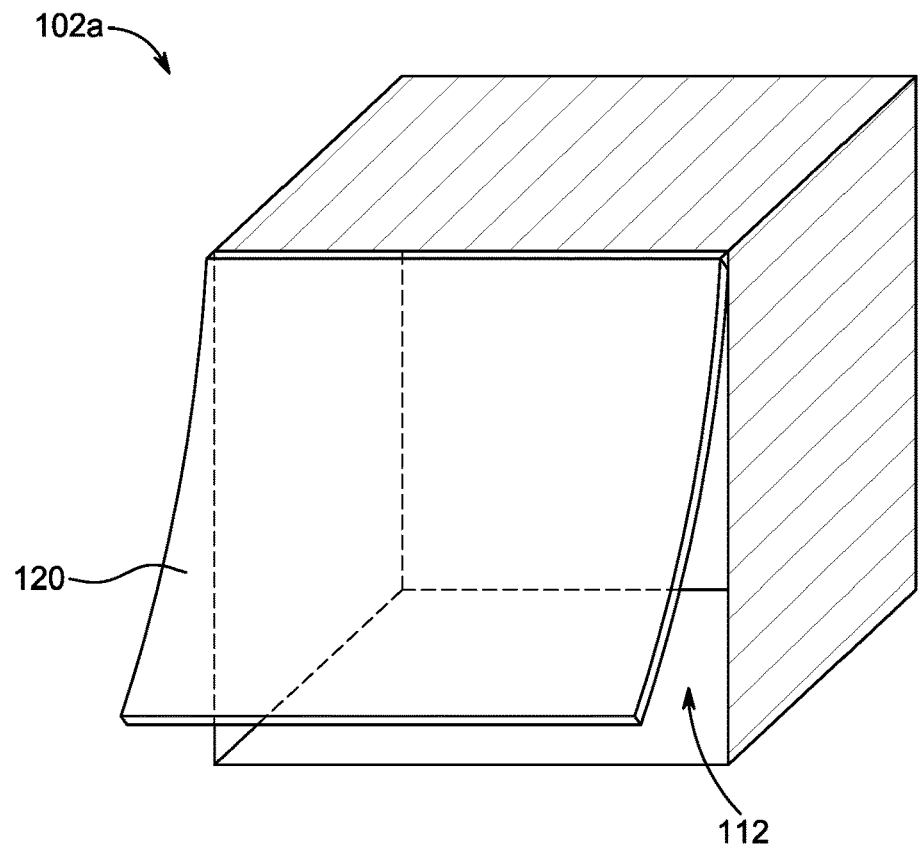
FIG. 1F illustrates a front view of a third slot carved on the first side of the pet mind toy, according to an embodiment of the present disclosure.

As shown in FIG. 1F, the first side 102a of the pet mind toy 100 may comprise the third slot 112 that is carved/configured into/onto the first side 102a, i.e., generally below the slot 106a. In one embodiment, the third slot 112 may be configured with space to place or hold a reward or treat in the pet mind toy 100. Furthermore, the third slot 112 may be a cubical box with pre-defined dimensions. In yet another embodiment, the third slot 112 may be a cube or pentagon. Further, the third slot 112 may be configured with at least one flap door 120 rotatably coupled at one side of the third slot 112 and kept free from the other side. Furthermore, the at least one flap door 120 may be configured for the pet to push open from the other side and receive the treat or reward. Even further, the at least one flap door 120 may be opened by the pet using its head or paws/legs when retrieving the treat or reward. In one embodiment, the at least one flap door 120 may be constructed from a material selected from a group of materials including plastic, steel, wood, etc. In one exemplary embodiment, the at least one flap door 120 is constructed from hard plastic with an enough thickness to retain the treat within the third slot 112 and to allow the flap door 120 to be easily opened when pushed by the pet to get the treat. Furthermore, the third slot 112 may be of the same dimensions as the first slot 106a and the second slot 106b. In one exemplary embodiment, the third slot 112 may be 3.5 inches wide, 3.5 inches high, and 1-inch-deep into the pet mind toy 100.

Figure 1G:
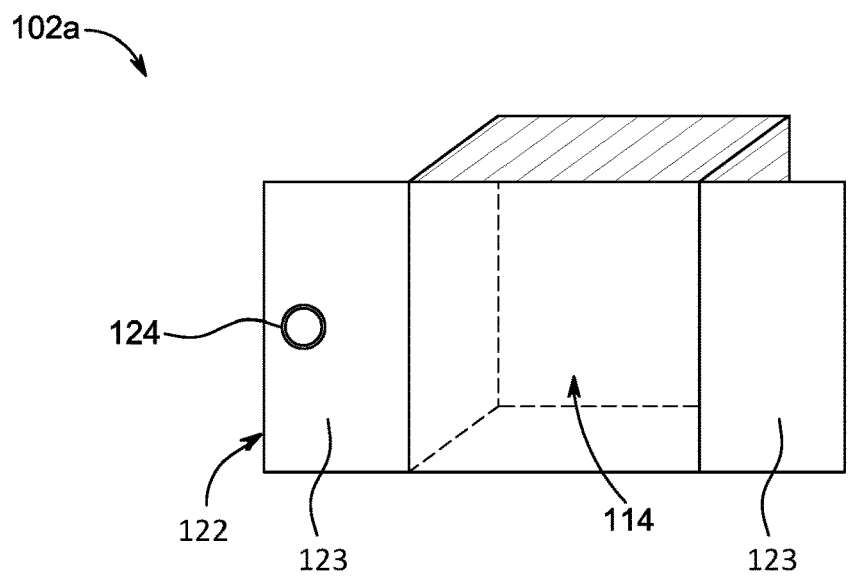
FIG. 1G illustrates a front view of a fourth slot carved on the first side of the pet mind toy, according to an embodiment of the present disclosure.
Figure 1H:
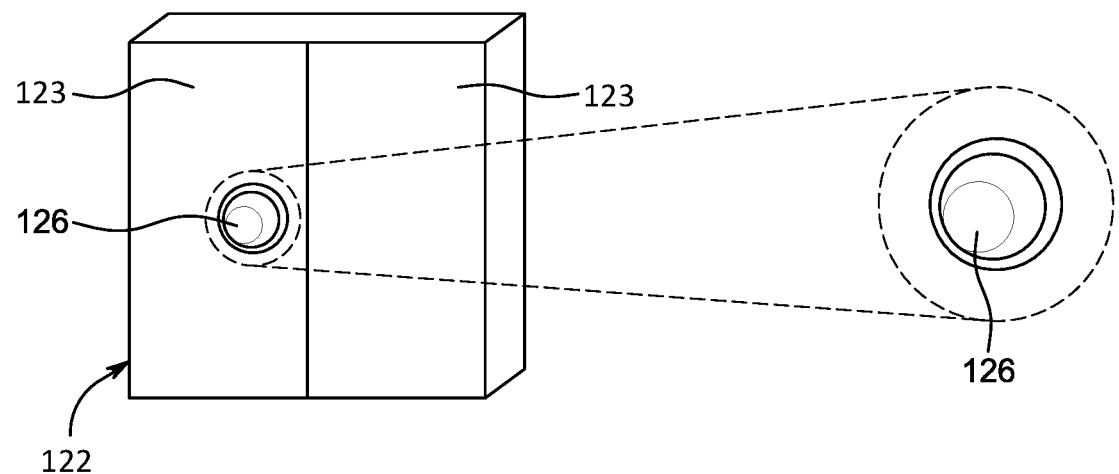
FIG. 1H illustrates a knob door of the fourth slot, according to an embodiment of the present disclosure.
Figure 1I:
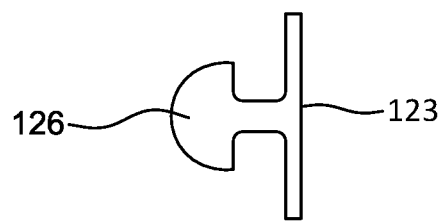
FIG. 1I illustrates a side view of the knob door of the fourth slot, according to an embodiment of the present disclosure.

As shown in FIG. 1G and FIG. 1H, the first side 102a of the pet mind toy 100 may comprise the fourth slot 114 of the pet mind toy 100. The fourth slot 114 may be utilized for the same purpose as the first slot 106a, the second slot 106b, and the third slot 112. Furthermore, the fourth slot 114 may comprise a space carved into the first side 102a of the pet mind toy 100 and may be located below the second slot 106b. Furthermore, the fourth slot 114 may comprise the space to store rewards and/or treats for the pet. Further, the fourth slot 114 may comprise at least one knob door 122 coupled rotatably at one side of the fourth slot 114. The at least one knob door 122 may be coupled to the fourth slot 114. Further, the at least one knob door 122 may comprise a hole 124 integrated at one end of the at least one knob door 122. Further, the hole 124 may be configured to receive the knob 126 (shown in FIG. 1G) for opening and closing the at least one knob door 122. The at least one knob door 122 may be configured to open and close the fourth slot 114 at other side using the knob 126. Furthermore, the knob 126 may be a spherical shaped ball with a diameter of 1.5 inches. Even further, the knob 126 may act as a handle to open and close the fourth slot 114, as shown in FIG. 1G.

Furthermore, the knob 126 may be configured to open and close the at least one knob door 122. In an embodiment, the dimensions of the fourth slot 114 may be the same as the third slot 112. In yet another exemplary embodiment, the at least one knob door 122 may be 0.5 inches thick. In another exemplary embodiment, the hole 124 may be 0.5 inches in diameter. In another exemplary embodiment, the knob 126 may be a spherical shaped ball with a diameter of 1.5 inches.

In one embodiment, the at least one knob door 122 may comprise one or more panels 123 as shown in FIG. 1G. The one or more panels 123 of the at least one knob door 122 may be configured to provide additional challenges to the pet requiring it to think more in order to get to the treat hidden inside the fourth slot 114. In this regard, the pet is required to open the one or more panels 123 of the at least one knob door 122. Furthermore, the size of the at least one knob door 122 may vary based upon the age and/or breed of the pet.

Figure 2A:
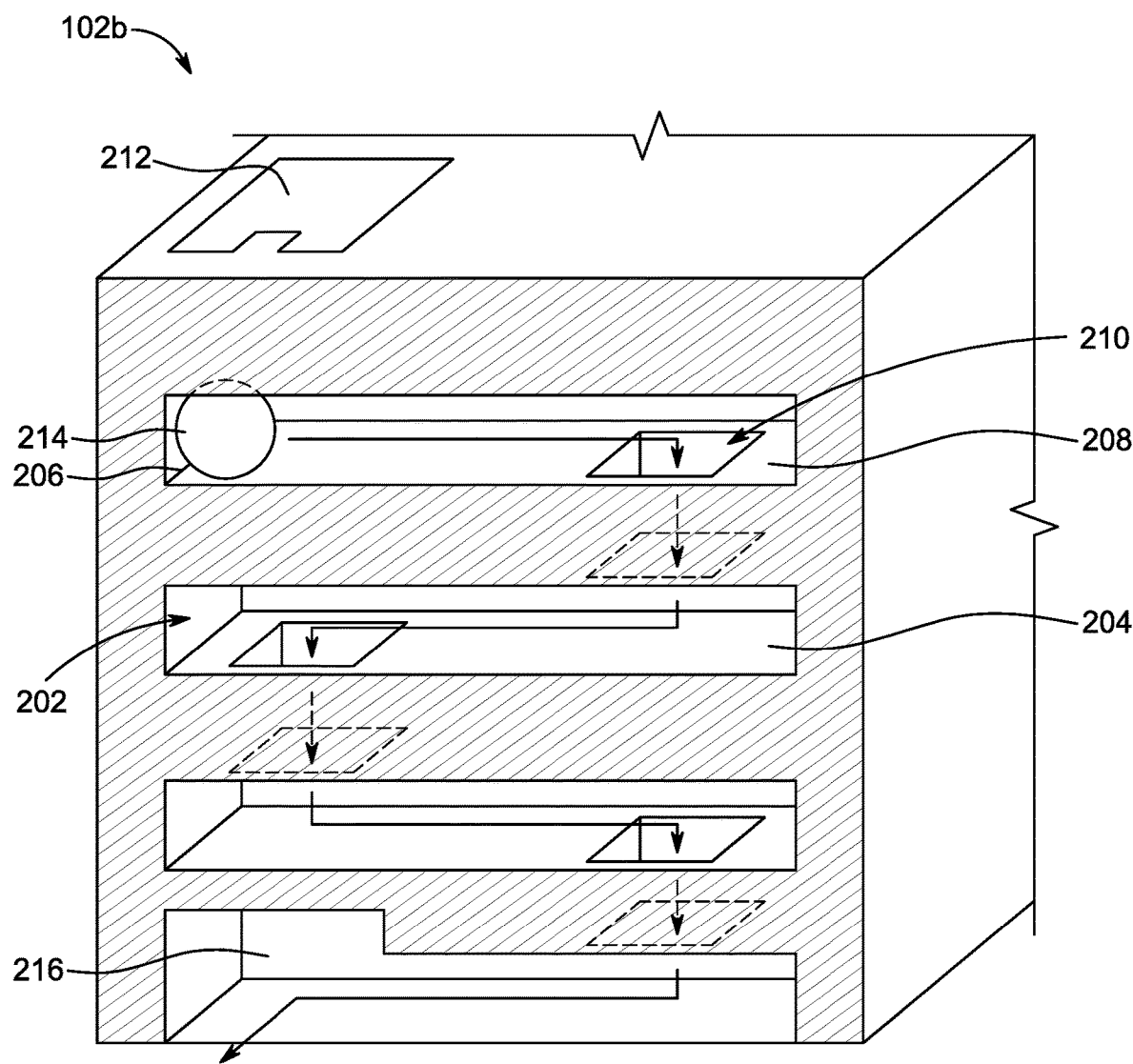
FIG. 2A illustrates a front view of a second side of the pet mind toy, according to another embodiment of the present disclosure.

FIG. 2A illustrates a front view of the second side 102b of the pet mind toy 100, according to another embodiment of the present disclosure. FIG. 2A is explained in conjunction with FIG. 1A, FIG. 2B, FIG. 3, FIGS. 4A-4B, and FIG. 5.

The second side 102b of the pet mind toy 100 may comprise a plurality of levels 202 that is carved/configured into/onto the second side 102b of the pet mind toy 100. Furthermore, the plurality of levels 202 may enclose a plurality of slides 204 from top to bottom of the second side 102b of the pet mind toy 100. Furthermore, the plurality of levels 202 may be rectangular shaped. Furthermore, each slide 204 of the plurality of slides 204 may comprise a first end 206 and a second end 208. Even further, the first end 206 and the second end 208 of each slide of the plurality of slides 204 may be provided with an opening 210, in an alternating fashion, as shown in FIG. 2A. It can be noted that the opening 210 integrated on the each slide 204 of the plurality of slides 204 may be configured to connect to an entry of the next slide 204 immediately below and so on. Furthermore, the second side 102b of the pet mind toy 100 may comprise an opening 212 that may include flap disposed at top of the plurality of levels 202. Furthermore, the opening 212 may be configured to receive a ball 214 into the first slide 204. Even further, the plurality of levels 202 may be carved/configured into/onto the second side 102b in a manner that the plurality of levels 202 covers a small portion of the ball 214, so that the ball 214 does not fall out of the plurality of slides 204. Furthermore, the second side 102b of the pet mind toy 100 may comprise an outer opening 216 integrated towards the first end 206 of a slide at the bottom of the second side 102b. In one embodiment, the ball 214 may be a tennis ball, fur ball, play ball, and the like which can rotate and slide over each slide 204.

In an example, the second side 102b of the pet mind toy 100 includes four levels with three slides and three openings, and the ball 214 is placed from the opening 212 at the top of the second side 102b. The ball 214 moves into a top or first slide of the three slides 204, wherein the pet may drag the ball 214 towards the opening 210 with its mouth or legs. Further, as soon as the ball 214 reaches a first opening 210, it falls into a second slide at a second level 202 downwards. Similarly, the pet may drag the ball 214 to a third slide at a third level and then into a fourth level or a bottom level of the second side 102b. It is envisioned that the plurality of slides 204 may be configured to allow the pet to move the ball 214 in an opposite direction (i.e., upward) as herein described. Further, the pet may drag the ball 214 towards the outer opening 216 and whereby the pet is able to remove the ball 214 out of the pet mind toy 100.

In one exemplary embodiment, the second side 102b of the pet mind toy 100 may be 16 inches high and 16 inches wide. Furthermore, the second side 102b may comprise at least four levels 202 and at least three slides 204 with at least three openings. Those skilled in the art will recognize that the pet mind toy 100 may be comprised of any number of slides of various dimensions. In one exemplary embodiment, each level 202 may be a rectangular section or rectangular window with length 12 inches and height of 2 inches, and each slide 204 may be 12 inches in length. In another exemplary embodiment, the opening 212 may be a square shaped slot with a flap cover. It can be noted that dimensions of the opening 212 may be more than the dimensions of the ball 214. In one embodiment, the opening 212 may be 3 inches wide and 3 inches long. Further, the outer opening 216 integrated at the bottom level 202 of the second side 102b may have height equal to more than the diameter of the ball 214. Those skilled in the art will recognize that the ball 214 may be of any diameter comparable and/or desired in accordance with the size of the windows, openings, and rectangular sections. In one exemplary embodiment, the height of the outer opening 216 may be 3 inches.

Figure 2B:
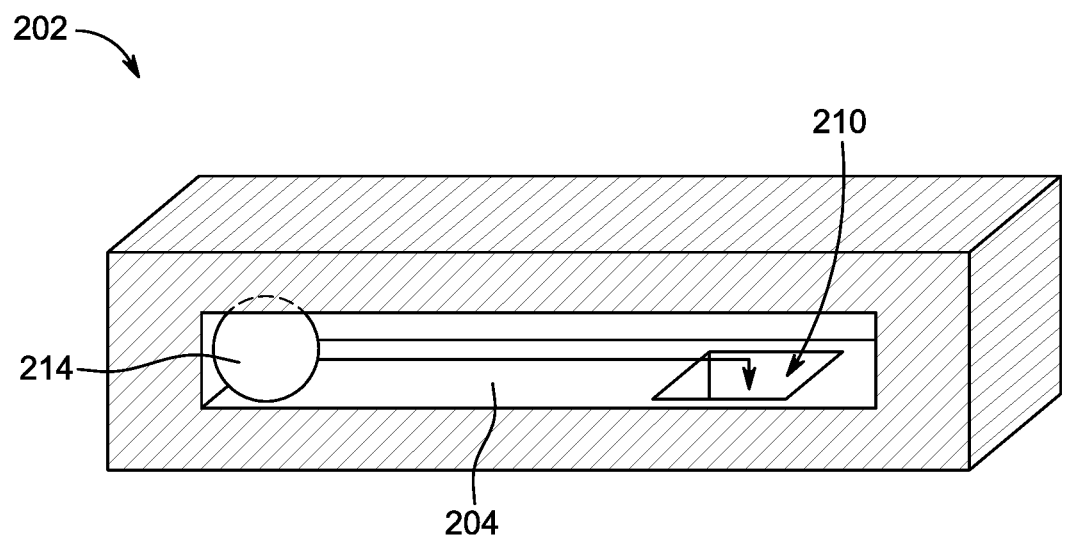
FIG. 2B illustrates a sectional view of the second side of the pet mind toy, according to another embodiment of the present disclosure.

FIG. 2B illustrates a sectional view of the slide 204 of the second side 102b of the pet mind toy 100, according to another embodiment of the present disclosure. FIG. 2B is explained in conjunction with FIG. 1A, FIG. 2A, FIG. 3, FIGS. 4A-4B, and FIG. 5. Further, the plurality of slides 204 may be configured to be stacked at an inclination from the first end 206 to the second end 208 of each slide. In one embodiment, the first end 206 may be placed slightly higher than the second end 208 of the plurality of slides 204 so that the pet may easily drag the ball 214 towards the opening 210. In one exemplary embodiment, the inclination of each slide of the plurality of slides 204 may be at least 5 degrees with respect to each level of the plurality of levels 202.

In one embodiment, the plurality of slides 204 may be placed parallel to the levels 202, as shown in FIG. 2A and FIG. 2B. That is, the plurality of slides 204 may not be inclined or declined with respect to the pet mind toy 100. As such, the plurality of slides 204 may be in perfect parallel to the pet mind toy 100. Due to this condition, whereby the plurality of slides 204 may not be inclined or declined at any angles, the ball 214 may not roll automatically due to gravitational energy, and therefore the pet may be required to put effort to drag the ball 214 through the opening 210. Furthermore, the ball 214 placed on the second side 102b moves from the first end of each slide to the second end 208 towards each opening 210 of each slide. Even further, the ball 214 placed on the second side 102b comes out of the pet mind toy via an outer opening integrated at one level of the plurality of levels 202.

In an embodiment, the plurality of levels 202 may be a rectangular box of pre-defined dimensions. Furthermore, each rectangular box may have a front opening for the pet to slide down the ball 214 towards the opening 210 at the second end 208 of the plurality of slides 204. It can be noted that the height of the front opening may be less than the total height of each rectangular box. In one embodiment, the plurality of levels 202 may be 3 inches deep carved into the second side 102b of the pet mind toy 100. In one exemplary embodiment, the plurality of levels 202 may comprise a total height of 3 inches with a front opening of 2 inches so that the ball 214 does not completely swing out of each level. In another exemplary embodiment, if the ball 214 is of a diameter of 3 inches, then only about 1-1.5 inches of the ball 214 may be visible from each level for the pet to push down the ball 214 towards the opening 210. It can be noted that the opening 210 at the plurality slides 204 may have dimensions equal to less than the dimensions of the opening 212 at the top of the second side 102b. In one exemplary embodiment, the opening 210 is a 3 inches square shaped cut to connect with the next level.

Figure 3:
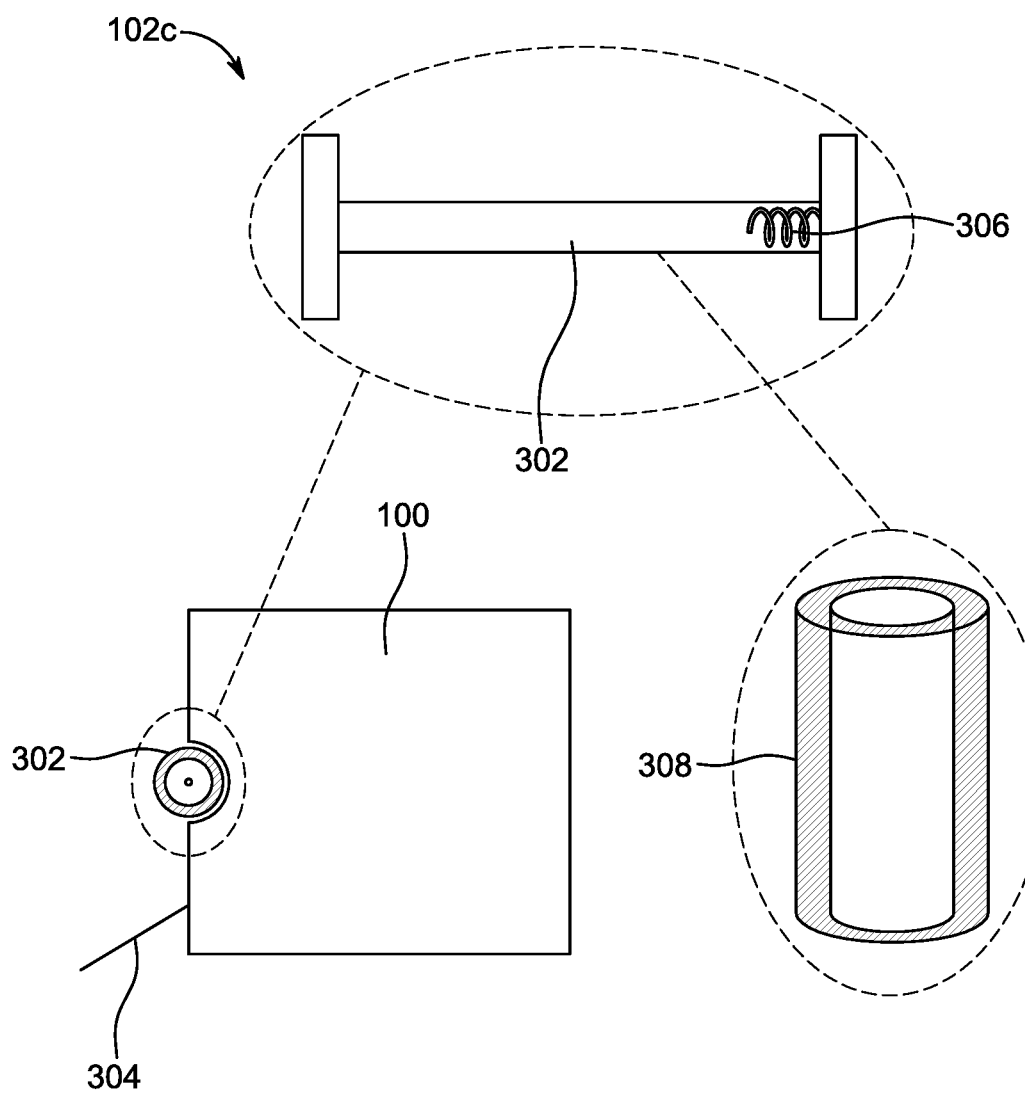
FIG. 3 illustrates at least one popsicle coupled on a third side of the pet mind toy, according to another embodiment of the present disclosure.

FIG. 3 illustrates the third side 102c of the plurality of sides 102 of the pet mind toy 100, according to an embodiment of the present disclosure. FIG. 3 is described in conjunction with FIGS. 1A-1G, FIGS. 2A-2B, FIGS. 4A-4B, and FIG. 5. The third side 102c of the plurality of sides 102 may comprise a rod 302, a tray 304, a spring 306, and one or more silicon holders 308. In an embodiment, the one or more silicon holders may be referred to as one or more popsicles. The rod 302 may be coupled to the third side 102c of the pet mind toy 100. Further, the rod 302 may be configured to receive the one or more silicon holders 308 and may be installed into the third side 102c of the pet mind toy 100. Furthermore, the one or more silicon holders 308 may be replaceable by another silicon holder. Further, the third side 102c may comprise the tray 304 positioned to catch ice drip from the one or more silicon holders 308 placed on the rod 302. In one embodiment, the tray 304 may be constructed from a material selected from a group of materials of plastic, steel, wood, etc. It can be noted that the rod 302 may be configured with the spring 306 to keep the popsicles in place.

Further, the third side 102c of the pet mind toy 100 may comprise the one or more silicon holders 308 coupled with the rod 302. In one embodiment, the one or more silicon holders 308 may be a cylindrical structure with one end open. In one exemplary embodiment, the one or more popsicles may be 7 inches tall with an outer diameter of 2 inches and an inner diameter of 1-1.5 inches. In one embodiment, the popsicles may continuously melt with respect to the surrounding temperature and the tray 304 may catch the melting ice drip from the silicon holder 308. In one embodiment, the one or more silicon holders 308 and the rod 302 may be fashioned like a toilet paper holder, affixed to the third side 102c of the pet mind toy 100. In another embodiment, the tray 304 may be placed transversely at an inclination to the third side 102c of the pet mind toy 100. Further, the one or more silicon holders 308 may be configured for the pet to quench thirst while playing with the pet mind toy 100. It can be noted that each pet mind toy 100 may have different popsicles for different pets. In one embodiment, the rate at which the pet consumes the one or more popsicles may be determined. Based upon the rate of consumption, the number of the popsicles may be changed in the pet mind toy 100 as desired.

Figure 4A:
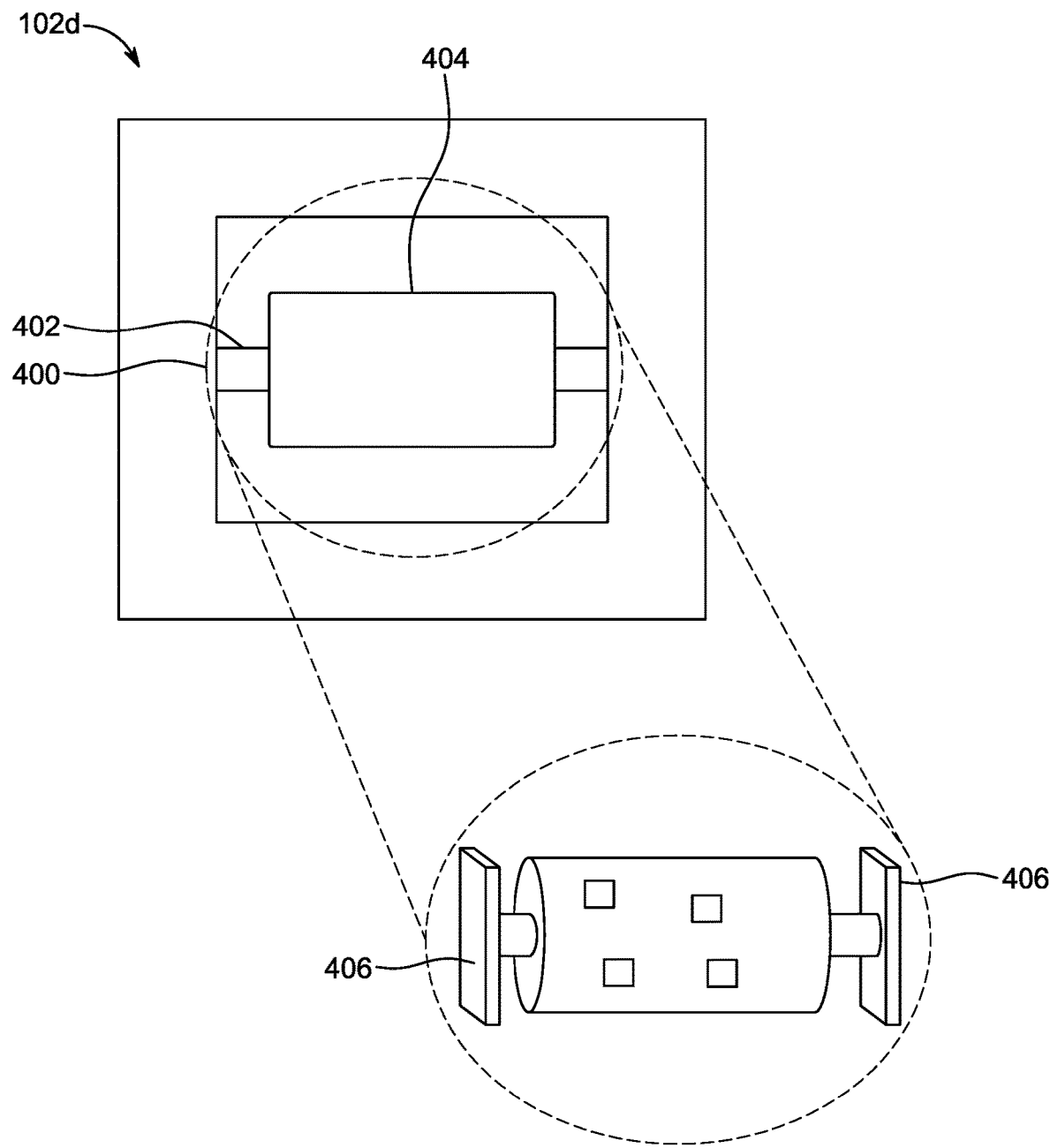
FIG. 4A illustrates a front view of a treat retrieval roller coupled at a fourth side of the pet mind toy, according to another embodiment of the present disclosure.
Figure 4B:
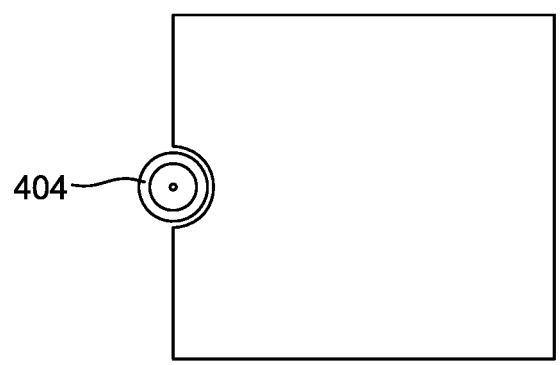
FIG. 4B illustrates a side view of the treat retrieval roller, according to another embodiment of the present disclosure.

FIG. 4A illustrates a treat retrieval roller toy 400 coupled at a fourth side 102d of the plurality of sides of the pet mind toy 100, according to another embodiment of the present disclosure. FIG. 4A is explained in conjunction with FIGS. 1A-1I, FIGS. 2A-2B, FIG. 3, and FIG. 4B. The treat retrieval roller toy 400 may be disposed or coupled at the fourth side 102d of the pet mind toy 100. In one embodiment, the fourth side 102d is 16 inches in height and width. Further, the treat retrieval roller toy 400 may comprise a shaft 402 and a roller 404. Furthermore, the shaft 402 may be integrated within the fourth side 102d such that, the roller 404 may rotate in clockwise or anticlockwise direction freely. Further, the roller 404 may be fabricated with one or more randomly placed recesses 406 configured for holding treats for the pet, such as peanut butter. In one embodiment, the treat retrieval roller toy 400 allows more engagement of the pet when the treats rotate in a particular direction. Further, the treat retrieval roller toy 400 is configured with one or more recesses 406 to include treat for the pet. Furthermore, the one or more recesses 406 are accessible by rotating the roller 404. In one embodiment, the treat retrieval roller toy 400 may also be configured with a small size treats to help in less calories consumption for the pet.

In an aspect, the pet may use its paw/legs or head to strike the roller 404, whereby the roller 404 may rotate in either a clockwise or anticlockwise direction, causing the treats placed inside the one or more recesses 406 to also rotate. It is envisioned that this rotation of the roller 404 and treats provide mental stimulation for the pet. In one embodiment, the one or more recesses 406 may be of one or more shapes including a triangle, a square, a circle etc. and of any size sufficiently constructed to hold treats. In an embodiment, the one or more recesses 406 may be of 0.5×0.5×0.25/0.5 inches in dimension and may be 0.2 inches in depth. In an aspect, the one or more recesses 406 may be used for placing peanut butter, fruits, sticky treat etc. In one embodiment, the one or more recesses 406 may be present at the entire surface of the roller 404.

Figure 5:
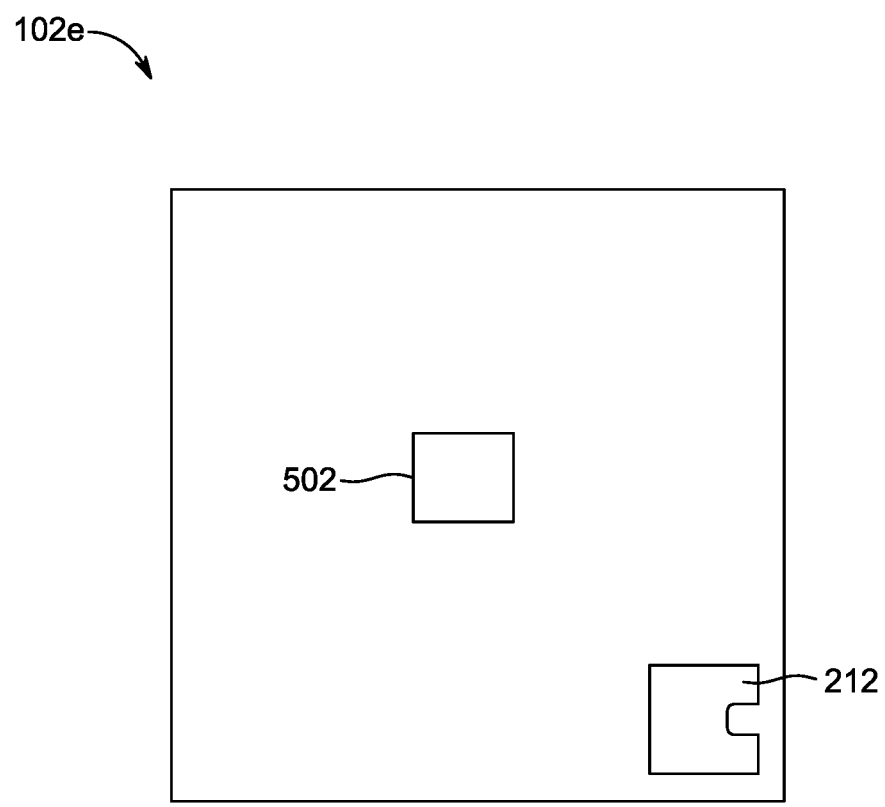
FIG. 5 illustrates a top view of a fifth side of the pet mind toy, according to another embodiment of the present disclosure.

FIG. 5 illustrates a top view of a fifth side 102e of the pet mind toy 100, according to another embodiment of the present disclosure. FIG. 5 is explained in conjunction with FIGS. 1A-1I, FIGS. 2A-2B, FIG. 3, and FIGS. 4A-4B. The fifth side 102e of the pet mind toy 100 may comprise a storage opening 502 integrated at a center of the fifth side 102e. In one embodiment, the storage opening 502 may be configured with a storage space for carrying eateries, toys, etc. In an aspect, the storage opening 502 may be configured for carrying weighted objects such as water bottles, food boxes, etc. In another embodiment, the storage opening 502 may be a square shaped box carved into the fifth side 102e of the pet mind toy 100. It can be noted that the dimensions of the storage opening 502 may be of sufficient enough size for use as a storage space. In one exemplary embodiment, the storage opening 502 may be a 7-9 inches square with 4 inch in depth.

In an embodiment, the plurality of sides 102 may be blocked or hidden from accessing the puzzle by the pet in the pet mind toy 100. Furthermore, the plurality of sides 102 may comprise restricted access to train the pet via the pet mind toy 100. Even further, the access to the plurality of sides 102 may be controlled via a controller unit (not shown) connected wirelessly to a user device. Further, a user may monitor the activity of the pet at any time. Further, the pet mind toy 100 is configured with a motion sensor (not shown) and touch sensors (not shown) to monitor the activity of the pet.

In one alternate embodiment, the purpose of the pet mind toy 100 may be used to keep the pet happily occupied for a period of time, particularly when pet owners are not available for interaction with the pet. Further, the different mind stimulating tasks as previously mentioned may be played by the pet using the above mentioned pet mind toy 100. In one embodiment, the pet mind toy 100 is modular and each side of the plurality of sides 102 may be assembled, disassembled and shuffled depending upon the requirement of the pet owner. In a further embodiment, the multi-activity toy or herein referred as pet mind toy 100 may be of any geometric shape such as a cube, pentagon, pyramid shape, rectangular, and alike.

It will be apparent to one skilled in the art that the above-mentioned components of the pet mind toy 100 have been provided only for illustration purposes. Further, embodiments of the present invention relate to an article of pet mind toy 100 that, upon installation turns into multi-activity mind stimulating toy for pets, without departing from the scope of the disclosure.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

LIST OF ELEMENTS

100 Pet mind toy
102 Plurality of Sides
102a First Side
102b Second side
102c Third side
102d fourth side
102e fifth side
104 Plurality of Edges
106a First Slot
106b Second slot
108 Locking Door
110 Locking Means
112 Third Slot
114 Fourth slot
116 Lock
118 Sliding Rod
120 Flap Door
122 At least one Knob Door
123 One or more Panels
124 Hole
126 Knob
202 Plurality of Levels
204 Plurality of Slides
206 First End of each Slide
208 Second End of each Slide
210 Opening
212 Opening
214 Ball
216 Outer Opening
302 Rod
304 Tray
306 Spring
308 Silicon Holder
402 Shaft
404 Roller
406 One or more recesses
502 Storage opening

What is claimed is:
1. A pet mind toy comprising:
a plurality of sides detachably coupled to each other via a plurality of edges, wherein a first side of the plurality of sides comprises:
at least four slots carved into the first side configured to hold treats for a pet;

a plurality of doors, the plurality of doors comprising different types of doors configured to train the pet a variety of problem-solving skills, the plurality of doors comprising:
    at least two locking doors for at least two slots of the at least four slots, wherein the at least two locking doors are configured with locking means for the pet to learn to open;
    at least one flap door for at least one slot of the at least four slots, wherein the at least one flap door is openable at one or more angles and configured for the pet to learn to open; and
    at least one knob door for at least one slot of the at least four slots, wherein the at least one knob door is configured with one or more panels and configured for the pet to learn to open;
a second side of the plurality of sides comprises:
    a plurality of levels with each level having a slide parallel to the levels, and the slide having a first end and a second end;
    a plurality of openings integrated at the second end of each slide to connect the plurality of levels; and
    an opening integrated over the second side to receive a ball into the plurality of levels, configured such that the ball is moveable by the pet between the plurality of levels through the plurality of openings;
a third side of the plurality of sides having a rod coupled with at least one popsicle treat holder placed over a tray, wherein the rod is rotatable and the treat holder is rotatable by the pet; and
a fourth side of the plurality of sides affixed with a treat retrieval roller toy for the pet to find and retrieve treats, wherein the treat retrieval roller toy comprises:
    a shaft integrated within the fourth side; and
    a roller attached with the shaft, rotatable in clockwise and anticlockwise direction; and
a fifth side of the plurality of sides configured with an opening for storing one or more objects.

2. The pet mind toy of claim 1, wherein each level of the plurality of levels exposes only a portion of the ball for the pet to push the ball down towards each opening of each slide.

3. The pet mind toy of claim 1, wherein the pet mind toy is at least a cube, a pentagon, a pyramid, or a rectangular shaped toy and is configured to stimulate the mind of the pet.

4. The pet mind toy of claim 1, wherein the locking means includes a latch, a knob or a lever.

5. The pet mind toy of claim 1, wherein the ball placed on the second side moves from the first end of each slide to the second end towards each opening of each slide.

6. The pet mind toy of claim 5, wherein the ball placed on the second side comes out of the pet mind toy via an outer opening integrated at one level of the plurality of levels.

7. The pet mind toy of claim 1, wherein the tray is a plastic tray used to catch melting ice from the treat holder.

8. The pet mind toy of claim 1, wherein the treat holder comprises a popsicle.

9. The pet mind toy of claim 1, wherein the plurality of sides are modular and interchangeable.

10. The pet mind toy of claim 1, wherein the roller is configured with one or more recesses randomly placed to store treats for the pet.

11. The pet mind toy of claim 10, wherein each of the one or more recesses is 10.5×10.5×0.25/0.5 inches in dimension and 0.2 inches in depth.

12. The pet mind toy of claim 10, wherein each of the one or more recesses is configured to place small size treats to maintain controlled caloric consumption for the pet.

13. The pet mind toy of claim 1, wherein the at least two locking doors correspond to at least one latch door or knob door.

14. The pet mind toy of claim 1, wherein the one or more objects includes treats, water bottles, or toys.

15. The pet mind toy of claim 1, wherein the pet mind toy comprises materials selected from plastic, metal, fiber, or moldable plastic.

16. The pet mind toy of claim 1, wherein the treat holder is a silicon holder.

17. A pet mind toy comprising:
a plurality of sides detachably coupled to each other via a plurality of edges, wherein a first side of the plurality of sides comprises:
    at least four slots carved into the first side configured to hold treats for a pet;
    a plurality of doors, the plurality of doors comprising different types of doors configured to train the pet a variety of problem-solving skills, the plurality of doors comprising:
        at least two locking doors for at least two slots of the at least four slots, wherein the at least two locking doors are configured with locking means for the pet to learn to open;
        at least one flap door for at least one slot of the at least four slots, wherein the at least one flap door is openable at one or more angles and configured for the pet to learn to open; and
    at least one knob door for the at least one slot of the at least four slots, wherein the at least one knob door is configured with one or more panels and configured for the pet to learn to open;
a second side of the plurality of sides comprise:
    a plurality of levels with each level having a slide parallel to the levels, and the slide having a first end and a second end;
    a plurality of openings integrated at the second end of each slide to connect the plurality of levels; and
    an opening integrated over the second side to receive a ball into the plurality of levels, configured such that the ball is moveable by the pet between the plurality of levels through the plurality of openings;
a third side of the plurality of sides having a rod coupled with at least one treat holder placed over a tray, wherein the rod is rotatable and the treat holder is rotatable by the pet, wherein the at least one treat holder allows to determine rate of consumption of a treat by the pet;
a fourth side of the plurality of sides affixed with a treat retrieval roller toy for the pet to find and retrieve treats, wherein the treat retrieval roller toy comprises:
    a shaft integrated within the fourth side; and
    a roller attached with the shaft, rotatable in clockwise and anticlockwise direction, wherein the roller is configured with one or more recesses to hold treats to be retrieved by the pet; and
a fifth side of the plurality of sides configured with an opening for storing one or more objects.

18. The pet mind toy of claim 17, wherein the one or more recesses are randomly configured over the roller to place treats for the pet.

19. The pet mind toy of claim 17, wherein the at least two locking doors correspond to at least one latch door or knob door.

20. The pet mind toy of claim 16, wherein the silicon holder is configured to hold a popsicle.

\* \* \* \* \*